United States Patent [19]
Ko

[11] Patent Number: 5,748,494
[45] Date of Patent: May 5, 1998

[54] METHOD AND ARRANGEMENT FOR RESOLUTION ENHANCEMENT

[76] Inventor: Wen-San Ko, No. 2 Lane 419, Wu Fei St., Tainan, Taiwan

[21] Appl. No.: 651,334

[22] Filed: May 22, 1996

[51] Int. Cl.$^6$ .................................................. G08C 21/00
[52] U.S. Cl. ........................... 364/525; 178/18; 178/19; 345/156; 345/158; 345/165
[58] Field of Search .................. 364/525; 178/17 D, 178/18, 19; 345/158, 156, 163, 164, 165, 166

[56] References Cited

U.S. PATENT DOCUMENTS

| | | | |
|---|---|---|---|
| 3,865,976 | 2/1975 | Grenier | 178/18 |
| 4,531,230 | 7/1985 | Brogardh | 382/187 |
| 4,568,182 | 2/1986 | Modjallal | 356/3.01 |
| 4,989,040 | 1/1991 | Matsuo et al. | 399/185 |
| 5,363,120 | 11/1994 | Drumm | 345/158 |
| 5,557,450 | 9/1996 | Sun | 359/234 |

*Primary Examiner*—Emanuel T. Voeltz
*Assistant Examiner*—Demetra R. Smith
*Attorney, Agent, or Firm*—David & Raymond; Raymond Y. C. Chan

[57] ABSTRACT

A method and arrangement for resolution enhancement of a coordinate input device. The method includes the steps of receiving a predetermined number of light beams, which are generated from a light source and passed through a rotating grating disc, by a light detector; detecting the intensity of the light beams by the light detector so as to receive a continuous response voltage signal; converting the continues response voltage signal to a digital signal; and distinguishing the digital signal as at least three different detecting modes by a plurality of predetermined critical values for enhancing the resolution of the coordinate input device. The arrangement includes a light detector having at least two light sensors for receiving at least two light beams generated from a light source and passed through a rotatable grating disc, wherein the light sensors detect the intensity of the light beams as at least three different detecting modes and generate a predetermined number of continuous response voltage signals. A pair of analog digital converters, which are connected with the two light sensors, are adapted to transform the continuous response voltage signals to a predetermined number of digital signals for distinguishing the varying between the three different detecting modes. A computing determination logic is connected with the pair of analog digital converted for distinguishing the different detecting modes of the digital signals according to a plurality of predetermined critical values for resolution enhancement.

35 Claims, 5 Drawing Sheets

METHOD AND ARRANGEMENT FOR RESOLUTION ENHANCEMENT

BACKGROUND OF THE PRESENT INVENTION

The present invention relates to a displacement distance detecting device, such as mouse coordinate, rotation encoder, and optic rulers, and more particularly to a method and arrangement for resolution enhancement, capable of enhancing the resolution of such displacement distance detecting device at least up to twice as much.

In order to fulfill the quality of color screen, computer surveillance monitor needs to continuously improve its resolution. Additionally, the input resolution of corresponding accessories also need to increase as well for better performance. A mouse is a basic computer input device and thus any improvement of enhancing its resolution is highly desired.

Referring to FIG. 1, a mouse which is a coordinate input device for computer comprises a coordinate ball 1, a pair of frictional contact members 2, a pair of grating discs 3 concentrically connected with the two frictional contact members 2 respectively, two light sources 4, and two light detecting 5, wherein the coordinate ball 1 and the frictional contact members 2 are in close contact. Due to the friction, when the coordinate ball 1 rotates, the frictional contact members 2 will substantially be driven to rotate simultaneously. Each of the frictional contact members 2 is affixed with the corresponding grating disc 3 coaxially by means of a rigidity axle. Therefore, when the frictional contact members 2 rotate, the grating discs 3 also rotate concurrently.

If the mouse is controlled on a mouse pad, the coordinate ball 3 can be rotated due to the friction between the mouse and the mouse pad. The frictional contact members 2 will also be driven to rotate with the coordinate ball 1 since the frictional contact members 2 are closely abutted against the coordinate ball 1. If the frictional contact members 2 rotate, the two grating discs 3 will, therefore, be driven to rotate respectively because each frictional contact member 2 is affixed by the rigidity axle with the respective grating disc 3 as mentioned above. In the order words, when a computer operator moves the mouse, the grating discs 3 are driven to rotate simultaneously.

Each of the grating discs 3 has a plurality of grating slots. Each of the light sources 4 generates a light beam directing to the corresponding grating disc 3. When the light beam passes through one of the grating slots of the respective grating disc 3 and is detected by the respective light detector 5, that light detector 5 then generates a corresponding signal to notify the computer for the displacement distance of the corresponding coordinate. One set of frictional contact member 2, grating disc 3, light sources 4, and light detectors 5 responds for the X-axis and the other set responds for the Y-axis, so that the mouse can control distance movement for both X-axis and Y-axis directions.

FIG. 2 illustrates the detecting principle of the conventional mouse coordinate input device. Since the innovatory technology of the present invention is to enhance the resolution of the output displacement in X-axis and Y-axis directions of a displacement distance detecting device, it is necessary to recite the basic resolution theory of the conventional mouse as follows.

As shown in FIG. 2, each light source 4 comprises two lighting diodes A', B' and each light detector 5 comprises two light sensors A and B. Normally, they are made of photoelectric chips. The lighting diode A' corresponds with the light sensor A, and the lighting diode B' corresponds with the light sensor B. Therefore, the light beam generated from the lighting diode A' is received by the light sensor A while the light beam generated from the lighting diode B' is received by the light sensor B. Then, the light sensors A and B generate corresponding detecting current as a corresponding signal to notify the computer for the displacement distance of the corresponding coordinate.

The lighting diodes A' and B' and light sensors A and B are installed on two opposite sides of the respective grating disc 3 respectively. The lighting diodes A' and B' and the light sensors A and B are disposed in such position that enables the grating disc 3 to block the light beam intervally during the rotation of the grating disc 3. Therefore, the rotating movement direction and the number of slots counted of the grating disc 3 can be determined through the block condition of the light beams generated from the lighting diodes A' and B', so that the displacement distance of any movement can be calculated by counting the number of the grating slots of the grating disc 3.

For examples, initially, both the light beams emitted from the lighting diodes A' and B' are not being blocked and pass through the corresponding grating slot to the light sensors A and B. As shown in FIG. 2, when the grating disc 3 rotates clockwise, the light beam emitted from the lighting diode A' will be blocked first, following by the block of the light beam emitted from the lighting diode B' later. If the grating disc 3 rotates counterclockwise, then the order of being blocked for the light beams emitted from the lighting diodes A' and B' would be reversed. Accordingly, the sensibility of the conventional mouse depends on the minimum displacement distance of the grating disc 3 which must be large enough for at least one of the light sensors A and B to detect the light beams passing through the respective grating slot of the grating disc 3, in order to distinct the direction and the grating slot's number of the grating disc 3. Therefore, the size of the grating slots of the grating disc 3 determines the resolution of the mouse.

The shorter the distance between the light sensors A and B, the size of each grating slot of the grating disc can be made more narrower. Therefore, the possibility of detecting the smallest displacement distance would increase, thus the resolution also increases. However, the light sensors A and B have limited substantial size. The closeness between the light sensors A and B is impossible to go infinite small, therefore, the size of the grating slots of the grating disc 3 is limited and thus limit the resolution.

SUMMARY OF THE PRESENT INVENTION

The present invention brings creative resolution to the conventional technology and concept. The main technical concept of the present invention is described as follows. As long as we can determine the block proportion of the light sensors A and B, then we can greatly increase the resolution. In the conventional mouse coordinate, it used digital circuitry to account for two opposite modes that are "completely block" and "completely not block". It means that the light sensors A and B can only detect two modes, i.e. "0" and "1". These information are used to determine the rotating direction and the slot count of the grating discs. The present invention breaks through such prior art concept that the light sensors A and B not only can distinguish the above mentioned two modes but also can distinguish up to three or even four modes. The resolution can be doubled if light sensors can distinguish three modes, including "completely block", "half block", and "completely not block" modes. If the light sensors A and B can distinguish four modes that are "completely block", "⅓ block", "⅔ block", and "completely not block", then the resolution can greatly be increased up to three folds. By applying the same principle, if the distinction ability of the light sensors for different modes can increase, then the resolution can also be increased linearly. Theoretically speaking, the resolution can be unlimited enhanced depending on the distinction ability of the light sensors A and B.

A main object of the present invention is to provide a practical method for enhancing the resolution of a coordinate input device for at least two folds.

Another object of the present invention is to provide an arrangement for resolution enhancement which can enhance the resolution of a coordinate input device for two folds or more.

Accordingly, a method for resolution enhancement of a coordinate input device includes the steps of receiving a predetermined number of light beams generating from a light source and passing through a rotating grating disc by a light detector; detecting the intensity of said light beams by said light detector so as to receive a continuous response voltage signal; converting said continues response voltage signal to a digital signal; and distinguishing said digital signal as at least three different detecting modes by means of a plurality of predetermined critical values for enhancing the resolution of said coordinate input device.

An arrangement includes a light detector having at least two light sensors adapted to receive at least two light beams generating from a light source and passing through a rotatable grating disc, wherein the light sensors detect the intensity of said light beams as at least three different detecting modes and generate a predetermined number of continuous response voltage signals. A pair of analog digital converters, which are connected with said two light sensors, are adapted to transform said continuous response voltage signals to a predetermined number of digital signals for distinguishing the varying between said three different detecting modes. A computing determination logic is connected with said pair of analog digital converted and adapted to distinguish said different detecting modes of said digital signals according to a plurality of predetermined critical values for resolution enhancement.

DETAILED DESCRIPTION OF THE PREFERRED EMBODIMENT

Figure 1:
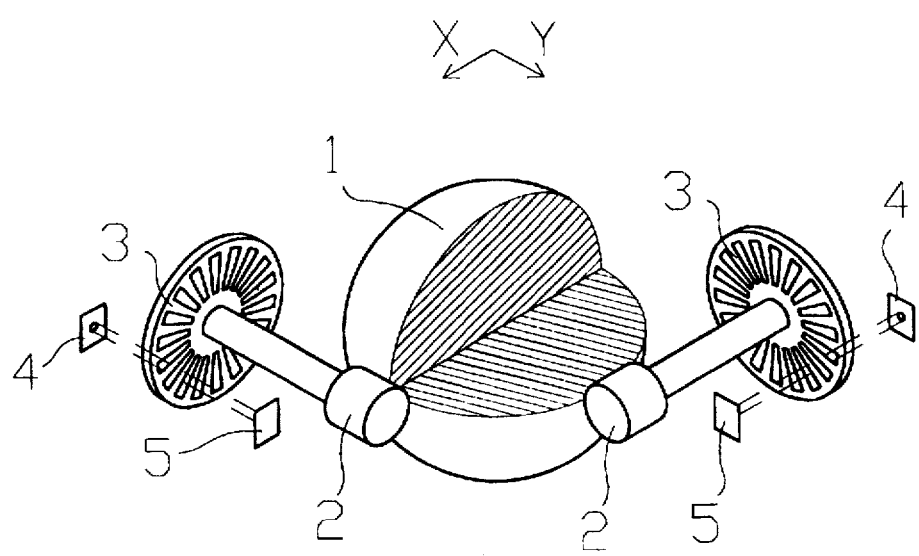
FIG. 1 is a perspective view of a mouse coordinate input device.
Figure 2:
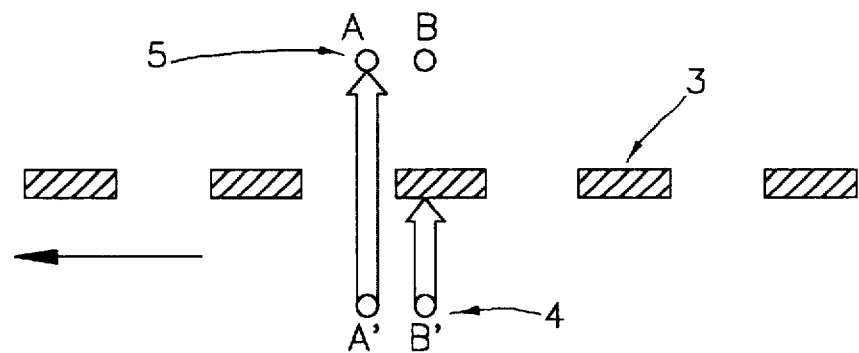
FIG. 2 is a schematic view illustrating the conventional detecting principle of the mouse coordinate input device.

FIG. 1 illustrate a coordinate input device, i.e. a mouse coordinate, in a known manner per se, which comprises a coordinate ball 1, a pair of frictional contact members 2, a pair of grating discs 3, two light sources 4, and two light detectors 5, wherein the coordinate ball 1 and the frictional contact members 2 are in close contact. Due to the friction, when the coordinate ball 1 rotates, the frictional contact members 2 will substantially and respectively be driven to rotate simultaneously. Each of the frictional contact members 2 is concentrically affixed with one of the grating discs 3 by means of a rigidity axle. Therefore, when the frictional contact members 2 rotate, the grating discs 3 also rotate respectively and concurrently. Each of the light sources 4 of the coordinate input device comprises two lighting diodes A' and B' and each of the light detectors 5 comprises two light sensors A and B. Normally, they are made of photoelectric chips. The lighting diode A' corresponds with the light sensor A, and the lighting diode B' corresponds with the light sensor B. Therefore, the light beam generated from the lighting diode A' is received by the light sensor A while the light beam generated from the lighting diode B' is received by the light sensor B. Then, the light sensors A and B generate corresponding detecting current as a corresponding signal to notify the computer for the displacement distance of the corresponding coordinate.

Figure 3:
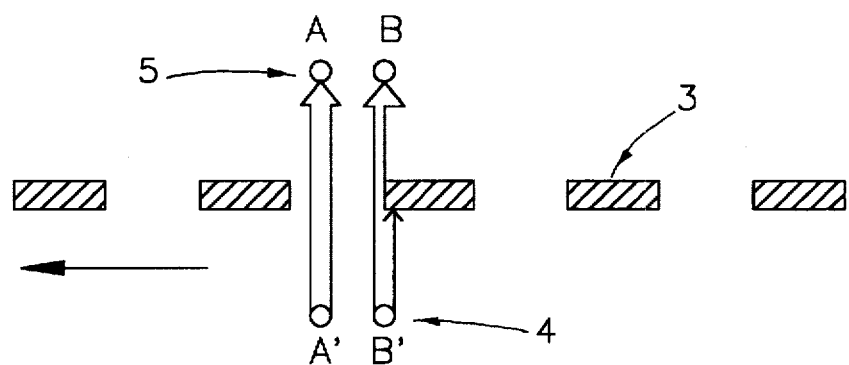
FIG. 3 is a schematic view illustrating the detecting principle of an arrangement for resolution enhancement according to a preferred embodiment of the present invention.

Referring to FIG. 3 illustrates the detecting principle of the coordinate input device of the present invention for enhancing the input resolution thereof. The basic requirement for increasing the resolution to two folds is that the light sensors A and B are adapted to distinguish three different modes, including the detecting modes of "completely block", "half block", and "completely not block". As shown in FIG. 3, when the grating disc 3 moves clockwise, the light sensor A not only can detect the two usual detecting modes of "completely block" and "completely not block", but also can detect an additional mode of that the light beam is "half block" by the grating disc 3. In the other words, the light sensor A can totally detect three different detecting modes, including "completely block", "half block", and "completely block". Base on the technology utilizing in the present invention, the resolution can be enhanced at least two folds without the need of decreasing the size of the grating slots of the grating disc 3.

Figure 4:
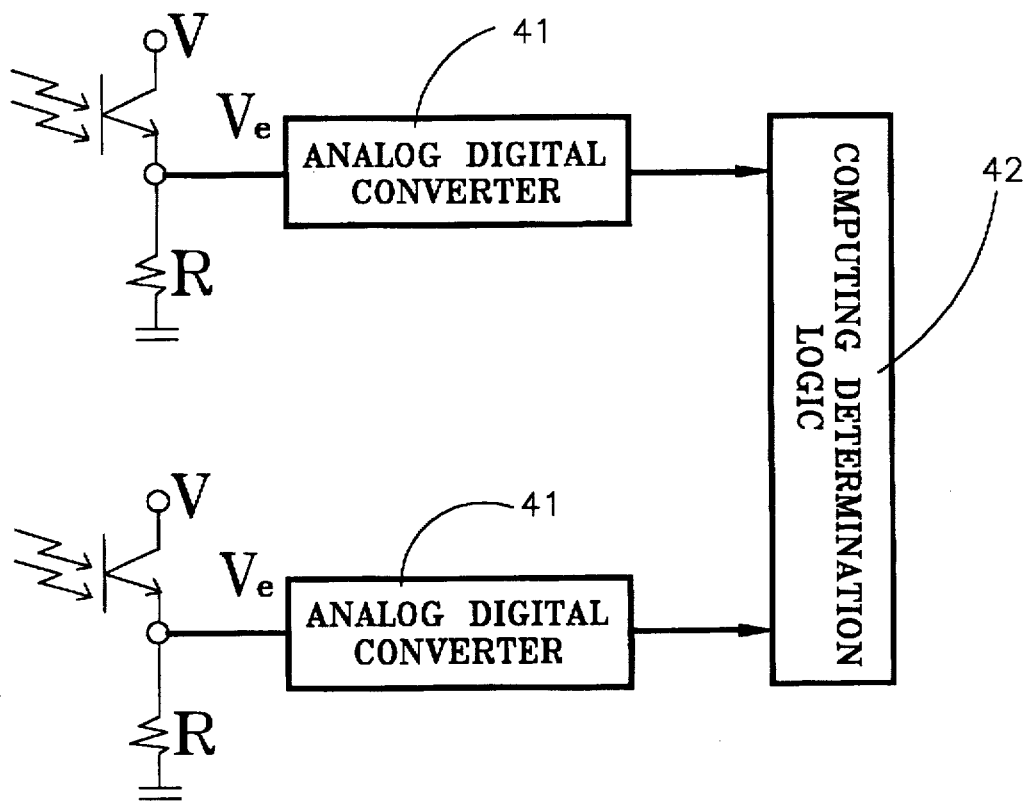
FIG. 4 is a block diagram of the arrangement for resolution enhancement according to the above preferred embodiment of the present invention.

Accordingly, a coordinate input device comprises two arrangement for resolution enhancement according to the present invention respective for the X-axis and the Y-axis movement of the device. Each of the arrangement is a detecting arrangement which not only can distinguish the usual "completely block" and "completely not block" detecting modes detected by the light detectors 5, but also can distinguish the "partially block" detecting mode, such as the "half block" or even the "⅓ block" and "⅔ block" detecting modes etc., detected by the light detectors 5. Referring to FIG. 4 of the drawings, for typical mouse, rotation encoder or optics ruler, photoelectric chips are utilized as the light detectors 5.

Therefore, the light sensors A and B would vary their electric current according to the intensity of the light beam received by the light sensors A and B. Various kinds of analog digital converting circuit or technology can be utilized to distinguish different light intensity modes in order to enhance the resolution. The arrangement for resolution enhancement, incorporating with the two light sensors A and B, as shown in FIG. 4, comprises two pairs of analog digital converters 41 and two computing determination logic 42. Each pair of the analog digital converters 41 are connected with the two photoelectric chips light sensors A and B respectively and one of the computing determination logic 42.

The light sensors A and B receive light beams from the light source 4 gradually through the grating slots during the rotation of the grating disc 3. When the photoelectric chips of the light sensors A and B gradually reach saturation, a discharging voltage Ve of each light sensor A and B gradually increases to a saturate voltage V. Each analog digital converter 41 then receives an analog signal from the respective light sensor A, B and converts such analog signal to a digital signal transferring to the computing determination logic 42. The computing determination logic 42 is capable of following a plurality of predetermined factors to distinguish different modes, such as the "completely block", "half block", and "completely not block" three modes or many other different modes, so as to calculate the displacement and direction of the movement of the mouse coordinate to enhance the input resolution of the mouse coordinate for many folds.

Figure 5:
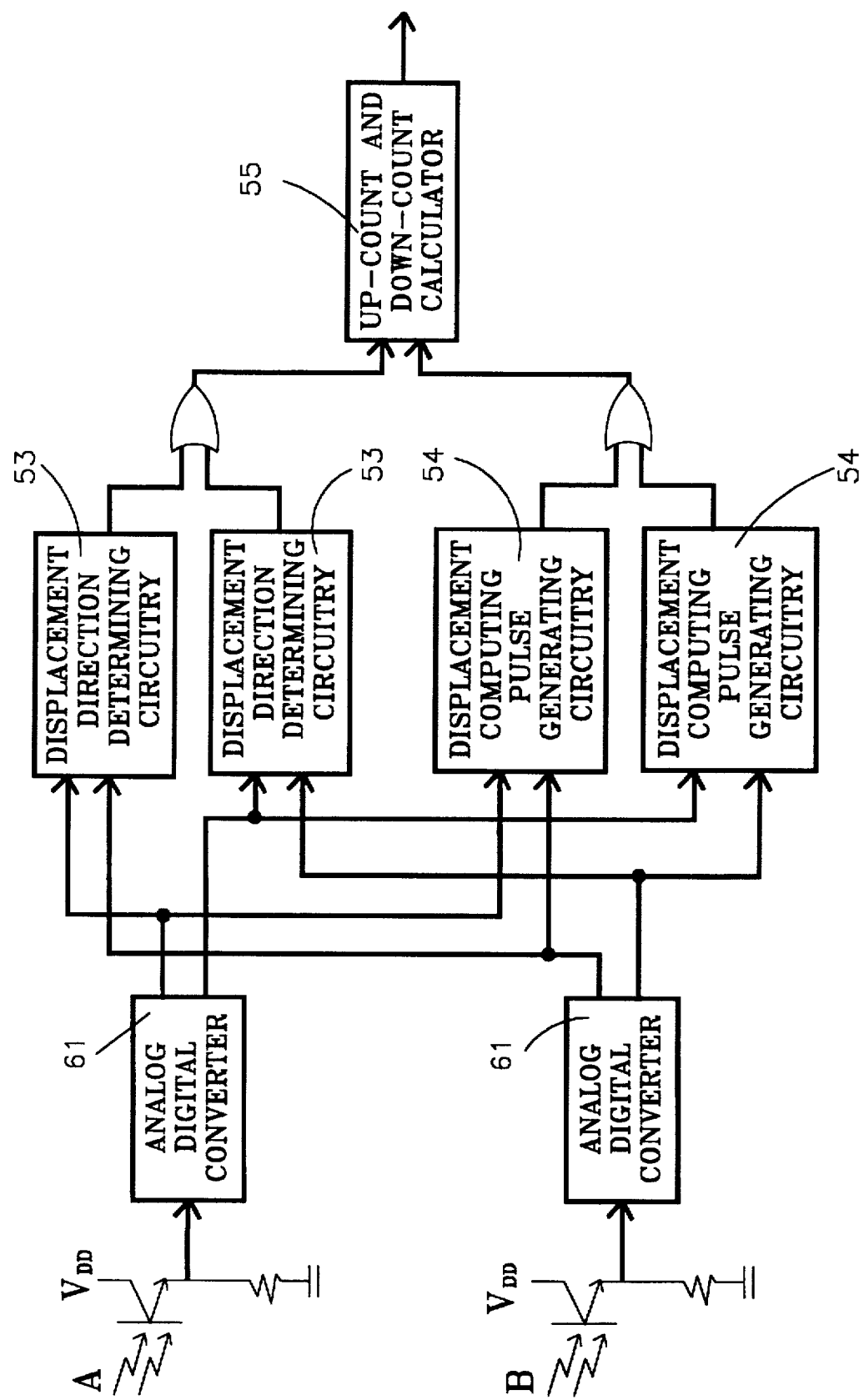
FIG. 5 is a circuit block diagram of the arrangement for resolution enhancement according to the above embodiment of the present invention.

Referring to FIG. 5, the coordinate input device comprises two arrangement for resolution enhancement for two folds. Each arrangement for resolution enhancement of the present invention comprises a pair of light sensors A and B, two analog digital converters 61 connected with the two light sensors A and B respectively, a pair of displacement direction determining circuitries 53, a pair of displacement computing pulse generating circuitries 54, and an up-count and down-count calculator 55. The pair of analog digital converters 61 can be any common conventional analog digital converting circuitry, or an inclination style analog digital converting circuitry which utilizes the features of photoelectric chips. The two analog digital converters 61 are connected with the light sensors A and B respectively. Each of the two analog digital converters 61 is further connected with the two displacement direction determining circuitries 53 and the two displacement computing pulse generating circuitries 54 respectively. Furthermore, the two displacement direction determining circuitries 53 and the two displacement computing pulse generating circuitries 54 are connected to the up-count and down-count calculator 55 respectively to accomplish the object of enhancing the mouse coordinate input resolution up to two folds.

When the grating disc 3 rotates counterclockwise, as described above, the detecting mode of the light sensor B will firstly be varied from "completely not block" mode to "half block" mode, wherein such detecting modes are distinguished by means the two analog digital converters 61. Similarly, if the grating disc 3 continues to rotate counterclockwise, the detecting mode of the light sensor B would vary from "half block" mode to "completely block" mode, wherein such detecting modes are also distinguished by means of two analog digital converters 61.

Accordingly, by means of the two analog digital converters 61, the input analog signals from the light sensors A and B are converted to digital signals that the output values of the light sensor B can be transformed to the three different detecting modes of "completely not block", "half block", and "completely block". Afterward, the distinction results are delivered to the displacement direction determining circuitries 53 and the corresponding displacement computing pulse generating circuitries 54 respectively so as to generate a respective pulse regarding to the rotating direction and displacement of the grating disc 3. Such pulse is then received by the up-count and down-count calculator 55 for collecting the information of the mouse movement and distributing such information for computer analysis.

In accordance with the above embodiment, the analog digital converter 41 or 61 can be a hardware circuitry, a software circuitry or a firmware circuitry or a combination of them. Accordingly, the analog digital converter 41 or 61 comprises an analog digital converting circuit constituting by a plurality of comparators. An alternative mode of the analog digital converter comprises a circuit formed by a comparator which has adjustable reference voltage. Another alternative mode of the analog digital converter comprises an analog digital converting circuit which is constituted by a plurality of logic gates having various input transform voltages. One more modification of the analog digital converter comprises an analog digital converting circuit which utilizes the current output features of the light sensors (such as photoelectric chips or photo-diodes) by charging their ultimate capacitors and circuitry miscellaneous dissipating capacitors to calculate the charging inclination.

Figure 6:
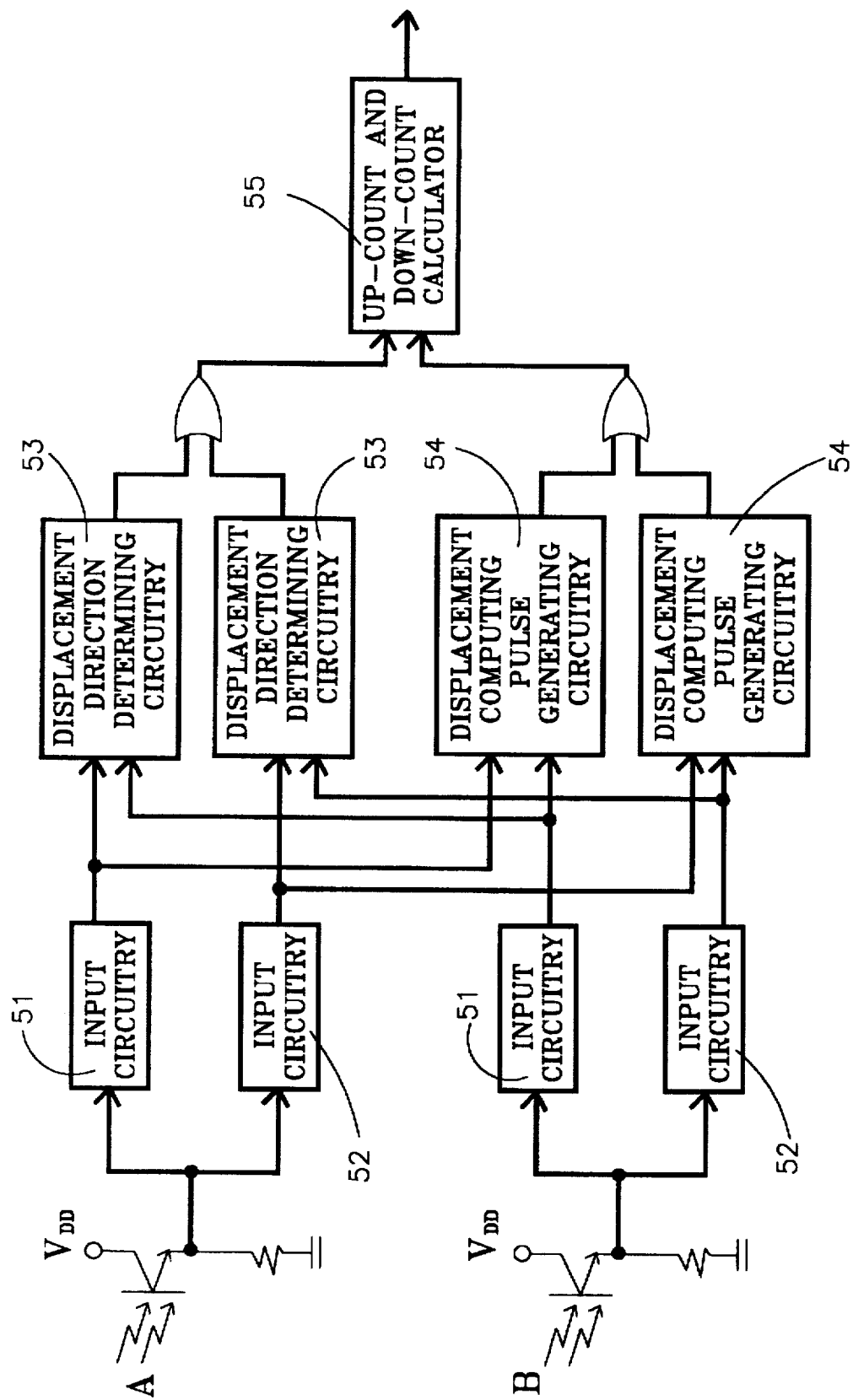
FIG. 6 is a circuit block diagram of an alternative mode of the arrangement for resolution enhancement according to the above preferred embodiment of the present invention.

Referring to FIG. 6, an alternative mode of the arrangement for resolution enhancement of the coordinate input device for two folds is illustrated. Basically, the alternative mode is similar to the above embodiment that the coordinate input device also comprises a pair light sensors A and B, a pair of displacement direction determining circuitries 53, a pair of displacement computing pulse generating circuitries 54, and an up-count and down-count calculator 55. The only difference of this alternative mode from the above embodiment as shown in FIG. 5 is that two pair of input circuitries 51 are utilized to replace the pair of analog digital converters 61 in the above embodiment. The two pair of input circuitries 51, 52 are connected with the two light sensors A and B respectively. One of the displacement direction determining circuitries 53 is connected with the two input circuitries 51 and the other displacement direction determining circuitry 53 is connected with the other two input circuitries 52 respectively. One of the displacement computing pulse generating circuitries 54 is connected with the two input circuitries 51 and the other displacement computing pulse generating circuitry 54 is connected with the other two input circuitries 52 respectively. The up-count and down-count calculator 55 is connected with the two displacement direction determining circuitries 53 and the two displacement computing pulse generating circuitries 54.

When the grating disc 3 rotates counterclockwise, as described above, the detecting mode of the light sensor B will firstly be varied from "completely not block" mode to "half block" mode, wherein such detecting modes are distinguished by means of a plurality of predetermined critical values of the corresponding input circuitry 51. Similarly, if the grating disc 3 continues to rotate counterclockwise, the detecting mode of the light sensor B would vary form "half block" mode to "completely block" mode, wherein such detecting modes are also distinguished by means of the plurality of predetermined critical values of the corresponding input circuitry 51.

Therefore, by means of the input circuitries 52 as mentioned above, the output values of the light sensor B can be transformed to the three different detecting modes of "completely not block", "half block", and "completely block". Afterward, the distinction results are delivered to the displacement direction determining circuitries 53 and the corresponding displacement computing pulse generating circuitries 54 respectively so as to generate a respective pulse regarding to the rotate direction and displacement of the grating disc 3. Such pulse is then received by the up-count and down-count calculator 55 for collecting the information of the mouse movement and distributing such information for computer analysis.

The input circuitries 51 and 52, the displacement direction determining circuitries 53, the displacement computing pulse generating circuitries 54, and the up-count and down-count calculator 55 themselves are conventional electronic circuitries in well known manner per se.

In accordance with the preferred embodiment described above, a new technology of enhancing the input resolution of mouse is disclosed as an example for explaining the related technology. However, other displacement distance detecting tool such as any rotation encoder or optic ruler can also utilize such technology of the present invention.

I claim:

1. A method for resolution enhancement of a coordinate input device, comprising the steps of
   (a) receiving a predetermined number of light beams generating from a light source and passing through a rotating grating disc by a light detector;
   (b) detecting the intensity of said light beams by said light detector so as to receive a continuous response voltage signal;
   (c) converting said continues response voltage signal to a digital signal; and
   (d) distinguishing said digital signal as at least three different detecting modes by means of a plurality of predetermined critical values for enhancing the resolution of said coordinate input device.

2. A method for resolution enhancement, as recited in claim 1, in which, in said step (a), said grating disc has a plurality of grating slots for said light beam to pass through and being received by said light detector, and that said detecting modes includes a "completely block" mode, a "half block" mode and a "completely not block" mode.

3. A method for resolution enhancement, as recited in claim 1, in which, in said step (a), said grating disc has a plurality of grating slots for said light beam to pass through and being received by said light detector, and that said detecting modes includes a "completely block" mode, a "⅓ block" mode, a "⅔ block" mode, and a "completely not block" mode.

4. A method for resolution enhancement, as recited in claim 1, in which said step (d) further comprises the following steps of
   delivering said detecting modes to a predetermined number of displacement direction determining circuitries and displacement computing pulse generating circuitries;
   generating a respective pulse regarding to a rotating direction and displacement of said grating disc; and
   receiving said respective pulse by a up-count and down-count calculator for collecting an information of said coordinate input device's movement and distributing said information for computer analysis.

5. An arrangement for resolution enhancement, comprising
   a light detector having at least two light sensors for receiving at least two light beams generated from a light source and passing through a rotatable grating disc, wherein the light sensors detect the intensity of said light beams as at least three different detecting modes of completely block, partially block and completely not block of said light beams by said grating disc, and generate a predetermined number of continuous response voltage signals;
   a pair of analog digital converters, which are connected with said two light sensors, transforming said continuous response voltage signals to a predetermined number of digital signals for distinguishing the varying between said three different detecting modes; and a computing determination logic which is connected with said pair of analog digital converted distinguishing said different detecting modes of said digital signals according to a plurality of predetermined critical values for resolution enhancement.

6. An arrangement for resolution enhancement, as recited in claim 5, in which said partially block mode is a half block mode.

7. An arrangement for resolution enhancement, as recited in claim 5, in which said partially block mode further comprises a ⅓ block mode and a ⅔ block mode.

8. An arrangement for resolution enhancement, as recited in claim 5, in which said light sensor is a photoelectric chips.

9. An arrangement for resolution enhancement, as recited in claim 5, in which said light sensor is a photo diode.

10. An arrangement for resolution enhancement, as recited in claim 5, in which said analog digital converter comprises an analog digital converting circuit constituting by a plurality of comparators.

11. An arrangement for resolution enhancement, as recited in claim 5, in which said analog digital converter comprises a circuit formed by a comparator which has an adjustable reference voltage.

12. An arrangement for resolution enhancement, as recited in claim 5, in which said analog digital converter comprises an analog digital converting circuit which is constituted by a plurality of logic gates having various input transform voltages.

13. An arrangement for resolution enhancement, as recited in claim 5, in which said analog digital converter comprises an analog digital converting circuit which utilizes a plurality of current output features of said light sensors by charging their ultimate capacitors and circuitry miscellaneous dissipating capacitors to calculate a charging inclination.

14. An arrangement for resolution enhancement, as recited in claim 5, in which, said analog digital converter is a hardware circuitry.

15. An arrangement for resolution enhancement, as recited in claim 5, in which said analog digital converter is a software circuitry.

16. An arrangement for resolution enhancement, as recited in claim 5, in which said analog digital converter is a firmware circuitry.

17. An arrangement for resolution enhancement, as recited in claim 5, in which said analog digital converter comprises a plurality of circuitries including a hardware circuitry, a software circuitry and a firmware circuitry.

18. An arrangement for resolution enhancement of a coordinate input device, comprising
   a light detector having at least two light sensors for receiving at least two light beams generated from a light source and passed through a rotatable grating disc, wherein the light sensors detect the intensity of said light beams as at least three different detecting modes of completely block, partially block and completely not block of said light beams by said grating disc, and generate a predetermined number of continuous response voltage signals;
   a pair of analog digital converters, which are connected with said two light sensors, transforming continues response voltage signals to a predetermined number of digital signals for distinguishing the varying between said three different detecting modes;
   a pair of displacement direction determining circuitries connected with said two analog digital converters respectively and a pair of displacement computing pulse generating circuitries connected with said two analog digital converters respectively, wherein said distinguished digital signals are delivered to said pair of displacement direction determining circuitries and said pair of displacement computing pulse generating circuitries respectively so as to generate a predetermined number of respective pulses regarding to a rotating direction and displacement of said grating disc; and an up-count and down-count calculator connected with said pair of displacement direction determining circuitries and said pair of displacement computing pulse generating circuitries respectively for collecting said pulse information of a movement of said coordinate input device and distributing such information for analysis.

19. An arrangement for resolution enhancement, as recited in claim 18, in which said partially block mode is a half block mode.

20. An arrangement for resolution enhancement, as recited in claim 18, in which said partially block mode further comprises a ⅓ block mode and a ⅔ block mode.

21. An arrangement for resolution enhancement, as recited in claim 18, in which said light sensor is a photoelectric chips.

22. An arrangement for resolution enhancement, as recited in claim 18, in which said light sensor is a photo diode.

23. An arrangement for resolution enhancement, as recited in claim 18, in which said analog digital converter comprises an analog digital converting circuit constituting by a plurality of comparators.

24. An arrangement for resolution enhancement, as recited in claim 18, in which said analog digital converter comprises a circuit formed by a comparator which has an adjustable reference voltage.

25. An arrangement for resolution enhancement, as recited in claim 18, in which said analog digital converter comprises an analog digital converting circuit which is constituted by a plurality of logic gates having various input transform voltages.

26. An arrangement for resolution enhancement, as recited in claim 18, in which said analog digital converter comprises an analog digital converting circuit which utilizes a plurality of current output features of said light sensors by charging their ultimate capacitors and circuitry miscellaneous dissipating capacitors to calculate a charging inclination.

27. An arrangement for resolution enhancement, as recited in claim 18, in which, said analog digital converter is a hardware circuitry.

28. An arrangement for resolution enhancement, as recited in claim 18, in which said analog digital converter is a software circuitry.

29. An arrangement for resolution enhancement, as recited in claim 18, in which said analog digital converter is a firmware circuitry.

30. An arrangement for resolution enhancement, as recited in claim 18, in which said analog digital converter comprises a plurality of circuitries including a hardware circuitry, a software circuitry and a firmware circuitry.

31. An arrangement for resolution enhancement of a coordinate input device, comprising a light detector having at least two light sensors for receiving at least two light beams generated from a light source and passed through a rotatable grating disc, wherein the light sensors detect the intensity of said light beams as at least three different detecting modes of completely block, partially block and completely not block of said light beams by said grating disc, and generate a predetermined number of continuous response voltage signals;

two pair of input circuitries connected with said two light sensors respectively for receiving said continuous response voltage signals and distinguishing, by means of a plurality of predetermined critical values of said input circuitries, the varying between said three different detecting modes of completely not block, partially block and completely block of said light beams by said rotatable grating disc;

a pair of displacement direction determining circuitries and a pair of displacement computing pulse circuitries, wherein one of said displacement direction determining circuitries is connected with one pair of said input circuitries and the other said displacement direction determining circuitry is connected with said another pair of input circuitries respectively, one of said displacement computing pulse generating circuitries being connected with one of said pair of input circuitries and the other said displacement computing pulse generating circuitry being connected with another said pair of input circuitries respectively, wherein a plurality of distinguished results are delivered from said input circuitries to said pair of displacement direction determining circuitries and said pair of displacement computing pulse generating circuitries respectively so as to generate a predetermined number of respective pulses regarding to a rotating direction and displacement of said grating disc; and an up-count and down-count calculator connected with said pair of displacement direction determining circuitries and said pair of displacement computing pulse generating circuitries respectively for collecting said pulse information of a movement of said coordinate input device and distributing said pulse information for analysis.

32. An arrangement for resolution enhancement, as recited in claim 31, in which said partially block mode is a half block mode.

33. An arrangement for resolution enhancement, as recited in claim 31, in which said partially block mode further comprises a ⅓ block mode and a ⅔ block mode.

34. An arrangement for resolution enhancement, as recited in claim 31, in which said light sensor is a photoelectric chips.

35. An arrangement for resolution enhancement, as recited in claim 31, in which said light sensor is a photo diode.

* * * * *